Figure 1:
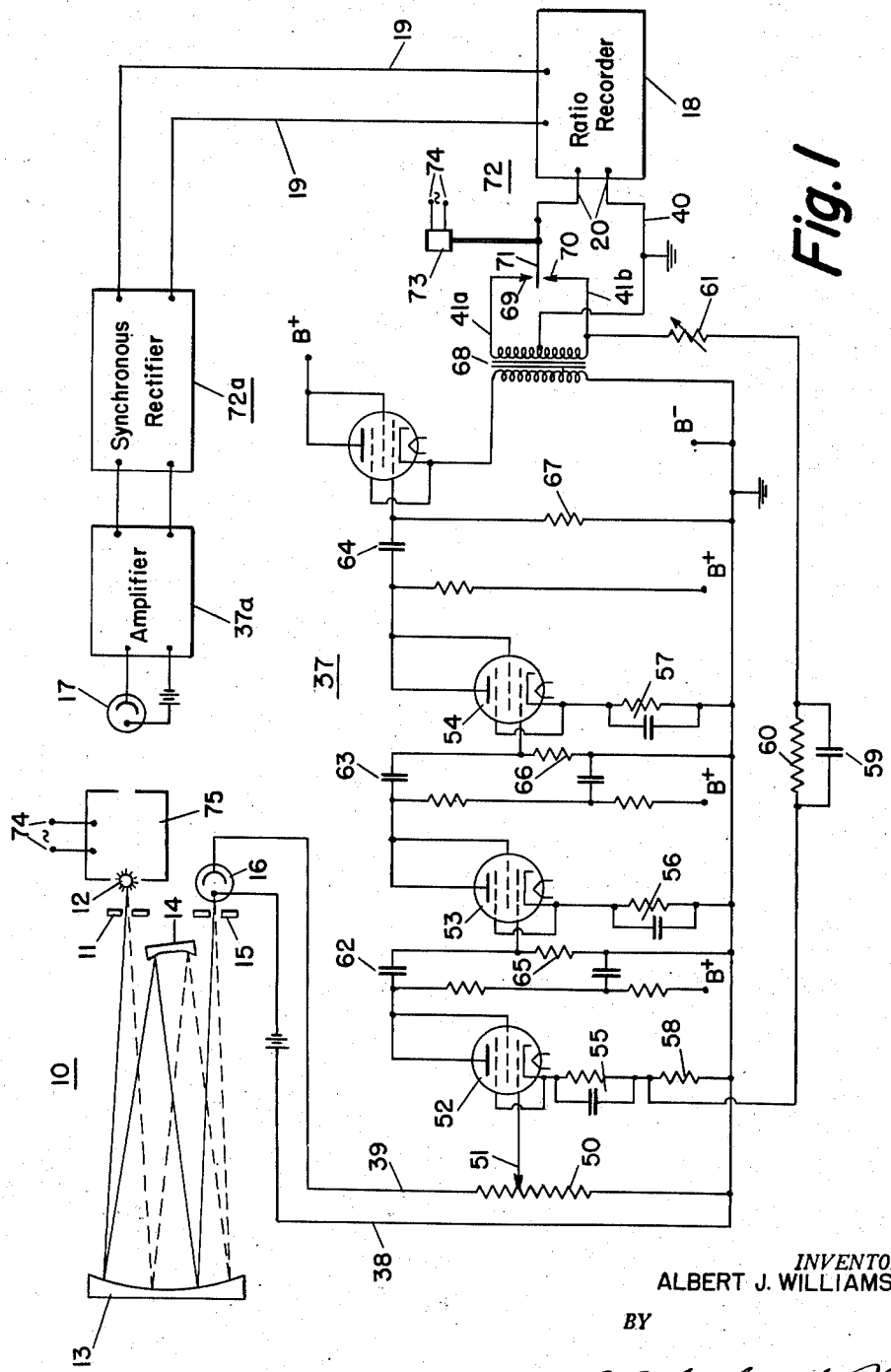

May 19, 1953   A. J. WILLIAMS, JR   2,638,811
PULSE AMPLIFIER SYSTEM FOR SPECTROGRAPHIC ANALYSIS
Filed April 22, 1950   3 Sheets-Sheet 1

*INVENTOR*
ALBERT J. WILLIAMS, JR.
BY
Woodcock and Phelan
ATTORNEYS

*INVENTOR*
ALBERT J. WILLIAMS, JR.
BY
Woodcock and Phelan
ATTORNEYS

May 19, 1953  A. J. WILLIAMS, JR  2,638,811
PULSE AMPLIFIER SYSTEM FOR SPECTROGRAPHIC ANALYSIS
Filed April 22, 1950  3 Sheets-Sheet 3

INVENTOR
ALBERT J. WILLIAMS, JR.
BY
Woodcock and Phelan
ATTORNEYS

Patented May 19, 1953

2,638,811

UNITED STATES PATENT OFFICE 2,638,811

PULSE AMPLIFIER SYSTEM FOR SPECTRO-GRAPHIC ANALYSIS

Albert J. Williams, Jr., Philadelphia, Pa., assignor to Leeds and Northrup Company, Philadelphia, Pa., a corporation of Pennsylvania Application April 22, 1950, Serial No. 157,541

12 Claims. (Cl. 88—14)

This invention relates to pulse amplifiers of the alternating current type in which there is provided in the output circuit a synchronous rectifier and has for an object the provision of a system in which there is avoided variation in the direct current output of the alternating current amplifier and rectifier due to phase shift of the synchronous rectifier.

This invention is particularly applicable to systems utilized in spectrographic analyses of various compositions where a radiation-responsive device has an output corresponding with the intensity of a selected line or lines of a spectrum produced from the composition. As more fully explained in co-pending application, Serial No. 93,491, filed May 16, 1949 for "Spectrographic Light-Source" by Raymond C. Machler, issued February 13, 1951 as United States Patent No. 2,541,877, the spectrum will be produced either by a spark discharge or by an arc discharge, depending upon the character of the composition or alloy upon which the analysis is to be made.

The repetition rate of the spark discharge, or the repetition rate and duration of the discharge of an arc, is controlled in manner such that the energies in successive discharges remain substantially constant within narrow limits. With each discharge, of arc or spark, a pulse is produced by a radiation-responsive device such as a phototube, the intensity of which is measured with reference to the intensity of a selected known line of the spectrum.

Such measuring systems are preferably of the type disclosed in co-pending application, Serial No. 715,936, filed December 13, 1946, for "Electrical Ratio-Measuring Systems" by Albert J. Williams, Jr., issued September 19, 1950 as United States Patent No. 2,522,976. Reference may also be had to the article entitled "Electronically Balanced Recorder for Flight Testing and Spectroscopy" by Albert J. Williams, Jr., et al., which appears in A. I. E. E. Transactions, vol. 65, 1946, pages 205–208, for details of such a ratio-measuring system.

It has been found desirable to include preamplifiers in ratio-measuring systems of said last-named co-pending application and of said publication in order to utilize signals from low-intensity lines of the spectrum. However, direct current amplifiers, if used, would increase the "dark-current" signals to the same degree as the signals due to the fainter lines of the spectrum. Hence, the signal-to-noise ratio would not be improved. However, with alternating current amplifiers it is necessary to rectify the output thereof for application to the ratio-measuring network. However, rectifiers of either the diode type or of the semi-conductor type do not have sufficiently linear characteristics to meet the exacting requirements of the spectrographic application. More particularly, the non-linearity of such types of rectifiers produces an apparent change in ratio not due to change in relative intensities of the lines of the spectrum under observation but due solely to the non-linearity of the rectifiers.

Synchronous rectifiers of the mechanical type have linear response characteristics but due to the fact that such synchronous rectifiers operate switching contacts, they have been found to be subject to slight phase shifts during operation; that is, like switching operations may occur at different times in the cycle of the alternating current used to drive them. These shifts in phase of the synchronous rectifier have been enough to introduce unwanted or spurious signals. More specifically, the shifts in phase of the synchronous rectifiers have produced a change in the ratio due solely to said shift of phase and not to a change in the ratio of intensity of the lines under observation.

It is the principal purpose of the present invention to provide a system including an alternating current amplifier and a synchronous rectifier in the output circuit which does not introduce any signals due to shifts in phase of the synchronous rectifier.

In carrying out the invention in one form thereof, a negative feedback circuit is provided between the output and input circuits of the alternating current amplifier, the feedback circuit including circuit elements having impedance characteristics which are materially different for low and high frequency components of the applied pulses for so modifying the amplifier characteristics as to produce a substantially uniform level of signal between pulses in avoidance of signals which would otherwise be introduced by change in phase operation of the rectifier in the regions in which said substantially uniform signal-level has been established. The pulse amplifier system for spectrographic analysis is herein claimed; the compensated pulse amplifier per se is claimed in copending divisional application Serial No. 312,204, filed September 30, 1952.

For a more detailed understanding of the invention and for further objects and advantages thereof reference is to be had to the following description taken in conjunction with the accompanying drawings, in which:

Fig. 1 diagrammatically illustrates a preferred embodiment of the invention;

Figs. 2a–5d are graphs useful in the explanation of the problems to be solved and the manner of their solution.

Referring to the drawings, the invention has been illustrated in one form as applied to a spectrometer 10 having an entrance slit 11 through which radiation from an excited specimen, as by an arc or a spark indicated by the source 12, passes to a collimating mirror 13 which directs the radiation to a diffraction grating 14. From the spectrum produced by the grating 14 a line corresponding with an element of the excited specimen is selected by the positioning of an exit slit 15 with respect to the diffraction grating 14 for passage to a radiation receiver such as a phototube 16. A second phototube 17 is arranged to receive radiation from a reference line of the spectrum or directly from the source 12. The output current of the phototube 16 is a function of the line-intensity which in turn depends upon the amount of the corresponding element present in the specimen.

While the spectrometer 10 may take various forms to direct upon the phototubes 16 and 17 the selected lines, the one illustrated in Fig. 1 includes novel features of a spectrometer which per se forms no part of the present invention.

As explained in said paper entitled "Electronically Balanced Recorder for Light Testing and Spectroscopy" and in said co-pending application, Serial No. 715,936, the radiation-responsive devices are preferably photomultipliers. These have heretofore been connected to a ratio-measuring circuit for operation of a ratio recorder 18 in accordance with the relative values of the intensity of the reference line and the line corresponding with the constituent of the substance being analyzed. Accordingly, in Fig. 1 the ratio recorder 18 is illustrated as having one input circuit 19 from phototube 17 and a second input circuit 20 from phototube 16. The earlier systems have been satisfactory for operation where the signal intensities have been high enough so that the existing signal-to-noise ratio is high enough for accurate measurement.

Figure 4:
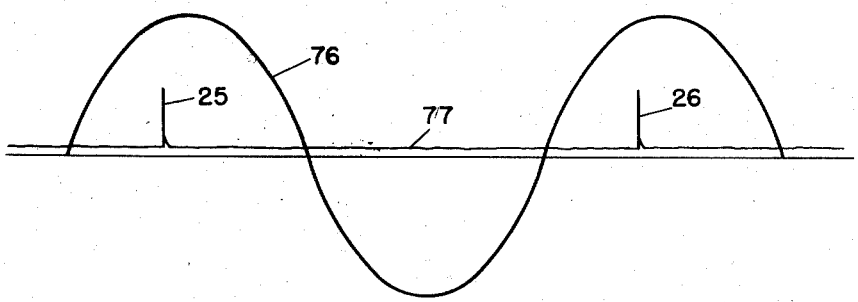
Figure 5:
Figure 5:
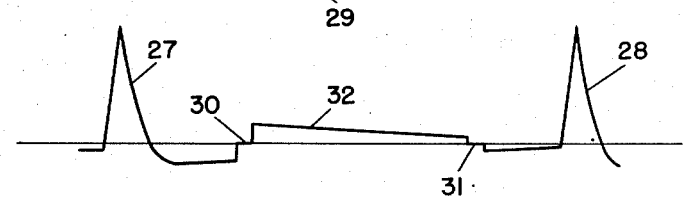
Figure 5:
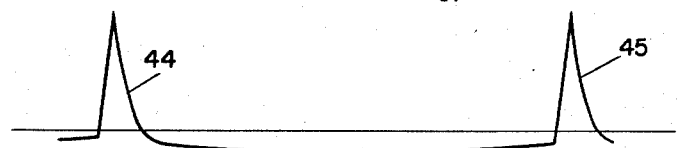
Figure 5:
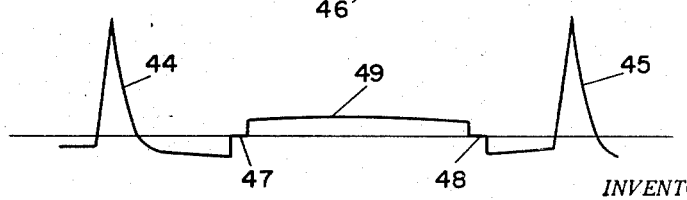

Because of the "dark current"; that is, the current flow during the absence of an output from the radiation source 12, as shown at 77 in Fig. 4, direct current amplifiers do not improve the signal-to-noise ratio where the signal, of course, represents the intensity of the respective spectral lines and the noise represents "dark current." Accordingly, to provide needed amplification for the measurement of the fainter spectral lines and at the same time to improve the signal-to-noise ratio, alternating current amplifiers are particularly advantageous. The output of such an alternating current amplifier is then converted to direct current for application to ratio-measuring networks of the type shown in said paper and in said application, Serial No. 715,936.

It has been found that the use of alternating current amplifiers of the type generally available are not suitable for use in spectrographic analysis for the reason that undesirable signals are introduced, which signals are not due to ratio differences between the selected spectral lines.

Figure 2A:
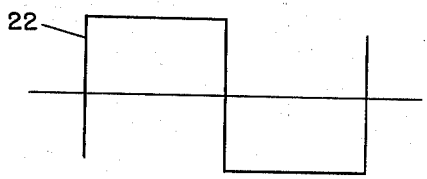
Figure 3A:
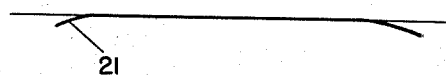

An understanding of the present invention will be aided by consideration of explanatory diagram Fig. 2a and related Fig. 3a. In the latter there is illustrated the output characteristic of a high fidelity amplifier, the output characteristic curve 21 being relatively flat over an extended frequency range as from about five cycles to ten kilocycles. If a square-wave alternating current signal be applied to such an amplifier of a frequency of the order of thirty cycles per second, there will appear in the output circuit thereof the square wave 22 shown in Fig. 2a. While such amplifiers faithfully reproduce in the output circuit the input signal, they also have long recovery times by reason of the circuit parameters which give them their good response, that is, long time constants, to the low frequency components of the applied signal. Where unsymmetrical input signals are applied to such amplifiers; that is, where the major peak amplitudes are either predominantly positive or negative in character, a material lapse of time is required for return to stabilized operation of the amplifier. Since these latter conditions are those encountered in the spectrographic application, such amplifiers have not proved satisfactory.

Figure 2B:
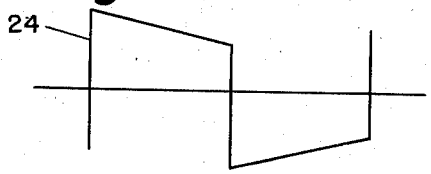
Figure 3B:

If the low frequency response of the amplifier be made less as indicated in the curve 23 of Fig. 3b, there will appear in the output circuit upon application thereto of a square wave an output signal as illustrated by the waveform as shown at 24 in Fig. 2b.

A difficulty encountered with such an amplifier is due to the slope of the top of each half cycle of the wave 24. That slope also appears upon application to such an amplifier of the spaced pulses of Fig. 4, such as 25 and 26, since there would then appear in the output circuit, Fig. 5a, pulses 27 and 28 interconnected by the upwardly inclined negative portion 29 of the signal. If a synchronous rectifier operates to reverse the output connections on either side of the open-circuit positions 30 and 31 of Fig. 5b, there will, of course, be a reversal of polarity of the intermediate portion of the negative output signal but the signal will decrease as indicated at 32. If the phase of the synchronous rectifier should change, it is to be understood that the regions 30 and 31 of circuit-changing positions of the rectifier will both be moved to the left or to the right of the position shown in Fig. 5b and by equal amounts. Thus, there will be with each change in phase a change in the included area below that portion of the signal represented at 32, a change of included area resulting in a change in the output signal of the amplifier-rectifier combination due solely to the change of said included area. Thus, such changed output signals would cause the ratio recorder to respond as though to a change in intensity of a spectral line.

Figure 2C:
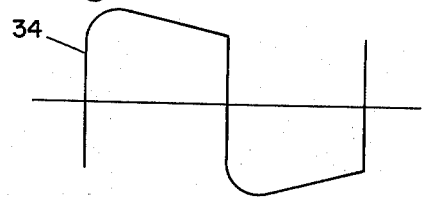
Figure 3C:

In an amplifier having an output characteristic as illustrated at 33 of Fig. 3c where there is attenuation of both the low and the high frequency, the foregoing problems persist as indicated by the output signal illustrated at 34, Fig. 2c, after application to the input circuit of a square-wave signal as in the previous cases.

Figure 3D:
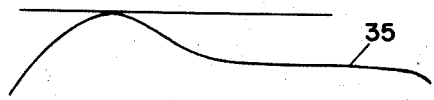

In accordance with the present invention, it has been found that change in the output signal due to phase shifts of the synchronous rectifier may be overcome by an amplifier having an output characteristic such as illustrated at 35 of Fig. 3d. The essential details of such an amplifier 37 are illustrated in Fig. 1, a like amplifier 37a being illustrated in block diagram for the phototube 17 the compensated pulse amplifier per se being claimed in said aforementioned copending divisional application Serial No. 312,204.

Figure 2D:
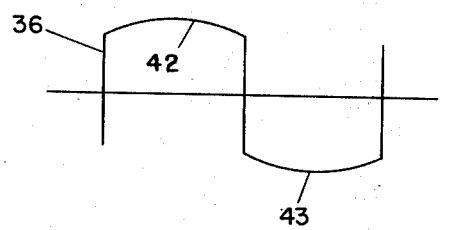

Upon application to the input circuit 38, 39 of a square wave as in the preceding case, there will appear in the output circuit 40, 41a and 41b the waveform illustrated at 36 in Fig. 2d. It will be observed that while there is some attenuation of the applied rectangular signal, the attenuation is uniform on either side of the maximum values of the square wave identified at 42 and 43.

If there be applied to the input circuit 38, 39 the pulses 25 and 26 of Fig. 4, there will appear at the output circuit 40, 41a and 41b amplified pulses 44 and 45, Fig. 5c. The signal level between said pulses 44 and 45 as indicated at 46 is maintained substantially uniform. Accordingly, when operating a synchronous rectifier from one rectifying position to the other, the open-circuit positions being shown at 47 and 48 in Fig. 5d, there is produced an intermediate output signal 49 of the same polarity as pulses 44 and 45. The intermediate output is of substantially the same value throughout the duration thereof and will remain at substantially that value with change in phase of the operation of the rectifier which results in simultaneous movement of the regions 47 and 48 to the right or to the left of their illustrated positions and by equal amounts.

The manner in which the desired characteristics for the amplifier of Fig. 1 are attained will now be explained in detail. The input circuit to the amplifier 37 includes an input resistor 50 across which there is developed the input signal from the phototube 16, a variable tap 51 thereto being connected to the grid of the first stage or tube 52 of the amplifier. Adjustment of the tap 51 serves as a gain control. The first stage of the amplifier as well as the later stages 53 and 54 include cathode-biasing circuits 55, 56 and 57. In the cathode circuit of the first tube 52 there is included a cathode resistor 58 which is not bypassed by a capacitor, the cathode resistor 58 forming a part of a negative feedback circuit including means for making substantially uniform the output signal level between adjacent pulses applied to the input circuit comprising impedance elements, at least one of which exhibits a materially different impedance to high frequency components of the pulses than to low frequency components of the pulses to apply a degenerative action to the amplifier which is greater for the high frequencies than for the low frequencies. The impedance element illustrated for that purpose is a capacitor 59 connected in parallel across a resistor 60, the combination being in series in the negative feedback circuit which also includes a resistor 61. The capacitor 59 has a low impedance to high frequency components and a high impedance to low frequency components. If an inductance be substituted for the capacitor in the feedback circuit, a parallel-connected resistance and inductance combination would be utilized in place of the resistor 58 in the cathode circuit of the tube 52.

The negative feedback circuit between the output and input circuits of the amplifier has its maximum feedback effect at frequencies above 60 cycles per second. This effect is obtained in the circuit shown by selecting the relative values of capacitor 59 and resistor 60, such that above 60 cycles per second capacitor 59 has an impedance lower than that of resistor 60, while below this frequency, capacitor 59 has an impedance greater than that of resistor 60. Thus, resistors 60, 61 and 58 determine the maximum feedback effective at frequencies above 60 cycles per second.

By such selection of the feedback circuit constants, adequate response to a square wave with a fundamental frequency as low as 30 cycles per second, as shown in Fig. 2d, is obtained, this being necessary since the duration of the negative portion 46 of the cycle in Fig. 5c, between the positive pulses 44 and 45 occurring at a 60 cycle repetition rate, is approximately 1/60 of a second, i. e., 1/2 cycle of a 30 cycle square wave.

For the described 60 cycle operation, the resistor 60 may have a value of the order of 12,000 ohms and the capacitor 59 a value of the order of one-quarter microfarad. The resistor 61 has a value of the order of 20,000 ohms. The cathode resistor 58 has a value of 100 ohms. The other circuit elements are conventional and proportioned to meet good design requirements of feedback amplifiers, except for the short time constant of one of the input circuits of one of the stages, as later explained. With the foregoing parameters, the response curve of the amplifier will be as shown by the curve 35 of Fig. 3d. It will be seen that there is substantial attenuation of low frequency components of the order of 10 cycles or one-sixth of the frequency of the alternating current furnished to operate the synchronous rectifier. There is minimum attenuation at about 30 cycles per second, and there is substantial attenuation above about 30 cycles; but above about 120 cycles the amplifier has a substantially flat or linear response.

To prevent long recovery time of the amplifier, it is desirable that the response at very low frequencies, such as 5 cycles, be limited. In the embodiment of the invention, shown in Fig. 1, capacitor 64 and resistor 67 are respectively .05 microfarad and 50,000 ohms, giving a short time constant to restrict the low frequency response of the amplifier.

Included in the output circuit 40, 41a and 41b is an output transformer 68 having a center-tapped secondary winding, the outer ends of which are connected respectively to stationary contacts 69 and 70 of a synchronous rectifier 72 having a movable contact 71 operable by the coil 73 energized from a suitable source of alternating current 74. The same source of alternating current supply, or one at the same frequency, is applied to the control of the source 12 indicated by the rectangle 75. The conventional 60-cycle alternating current source of supply made be utilized, the sine waveform 76 being illustrated in Fig. 4. The source 12 is controlled so that there is produced in each half cycle, at the positive cycle, a spark or an arc thereby to produce an output pulse 25 or 26 from the phototubes 16 and 17.

As above explained, these pulses are applied to the input circuit 38, 39 amplified and the synchronous rectifier 72 applies to the ratio recorder 18 a unidirectional output signal representative of the amplitude of the input signal. The synchronous rectifier 72 may be of the polarized vibrator type, the construction of which is well known to those skilled in the art, and one example of which is disclosed in co-pending application, Serial No. 725,465, filed by Albert J. Williams, Jr. and which is now U. S. Patent #2,614,188, granted October 14, 1952 (and also disclosed in Belgian Patent No. 479,515). The vibrator 72 may be either of the normally closed or the normally open type, but preferably of the latter type.

As indicated in Fig. 5d, the movable contact 71 will preferably be in an open-circuit position for a relatively short period of time as indicated at 47, and 48, or it will for the same short interval of time be in engagement with both stationary contacts 69 and 70 to provide zero output to the ratio recorder. When the contact 71 is in engagement only with the lower contact 70 the phasing, that is, the operation of the rectifier or vibrator 72 relative to the control of the source 12, is such that there is produced the pulse 44. In the absence of the rectifier there will be present the signal indicated at 44, 45 and 46, Fig. 5c, a signal which has no D. C. component and hence one which would be ineffective in operating the ratio recorder 18. After the application of pulse 44 to the input circuit, the contact 71 moves as at time 47, Fig. 5d, to engage the upper contact 69, Fig. 1, for flow of an output signal of the same polarity as the pulse 44, thus providing a unidirectional output for operation of ratio recorder 18. Thereafter, as at time 48, Fig. 5d, the contact 71 again moves to engage contact 70 preparatory to the appearance of a succeeding impulse 45.

It is to be understood the ratio recorder includes a filtering circuit for smoothing the unidirectional pulsating current applied thereto by way of synchronous rectifiers 72 and 72a.

It is to be further observed that the spacing between the regions 47 and 48, Fig. 5d, is slightly less than a half cycle. It is also to be noted that there is a region preceding the rectifier-transfer position 47 and following the rectifier-transfer position 48 in which the output signal level is of substantially the same amplitude. Consequently, wear of the contacts, changes in line voltage, changes in the parameters of the circuit constants of the driving circuit of the coil 73, or relative phase shift between the rectifier 72 and the source 12 will result in shift as a whole of the reversed output signal 49 to the right or to the left, the included area thereof remaining substantially constant in avoidance of production of output signals due solely to said phase shifts.

From the foregoing explanation it will be seen that there has been achieved in accordance with the present invention the desired amplification of the applied signal pulses, and rectification, with material increase in the signal-to-noise ratio and in avoidance of variation in the output signal due solely to phase shift of the rectifier.

It is again emphasized that rectifiers comprising electric valves or of the semi-conductor type have non-linear characteristics which make them undesirable for the present application. In contrast, the mechanical rectifier has good linear characteristics.

In Figs. 4, 5c and 5d only a single pulse, 25 or 44, per positive half cycle has been illustrated. It is to be understood, however, that the source 12 may produce any number of pulses 25 per positive half cycle, there being retained, however, the synchronous operation of the rectifier 72 in each negative half cycle of source 74 with respect to the control of the source 12 so that said pulses appear in timed relation with the operation of the rectifier. The features of the invention which have already been explained in detail apply to multiple-pulse operation as well as to the single-pulse operation utilized to simplify the explanation of the invention. The multiple pulses, that is, groups of pulses, may be produced in each half cycle of the reference voltage 76, in manner explained in Enns Patent No. 2,456,116.

While preferred modifications of the invention have been illustrated, it is to be understood, of course, that further modifications may be made within the spirit and scope of the appended claims.

What is claimed is:

1. In combination, an A. C. amplifier having an input circuit for application thereto of pulses at a predetermined repetition rate, an output circuit in which there appears an output signal including amplified pulses corresponding with those applied to said input circuit, a negative feedback circuit between said output and input circuits including impedance elements one of which has a low impedance for high frequency components of said pulses and a high impedance for lower frequency components of said pulses to maintain the output signal uniform between said pulses, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

2. In combination, an A. C. amplifier having an input circuit for application thereto of pulses at a predetermined repetition rate, an output circuit in which there appears an output signal including amplified pulses corresponding with those applied to said input circuit, a negative feedback circuit between said output and input circuits including impedance elements, at least one of which exhibits materially different impedance to high and low frequency components of said pulses for producing greater degenerative effect for the high frequency components than the low frequency components to maintain the output signal uniform between said pulses, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

3. In combination, an A. C. amplifier having an input circuit for application thereto of pulses at a predetermined repetition rate, an output circuit in which there appears an output signal including amplified pulses corresponding with those applied to said input circuit, a coupling circuit within said amplifier having a time constant which attenuates response of the amplifier to frequency components below one-half that of a reference frequency, means for making substantially uniform the output signal level between said pulses comprising a negative feedback circuit between said output and input circuits including impedance elements one of which has a low impedance for high frequency components of said pulses and a high impedance for lower frequency components of said pulses, a synchronous rectifier in said output circuit inherently subject to phase shift producing spurious output signals, and means for operating said synchronous rectifier at said reference frequency to produce its switching operations during the time said output signal level is maintained substantially uniform in avoidance of production of spurious output signals due solely to small shifts in phase in operation of said rectifier.

4. In an A. C. amplifying system for pulse-signals having a mechanical rectifier in the output circuit thereof, means for preventing appearance in said output circuit of signals due solely to phase shift of said rectifier comprising an A. C. amplifier having an input circuit for application thereto of said pulse-signals, a negative feedback circuit extending between said output and input circuits, and means including resistance and capacitance in said feedback circuit for imparting to the characteristic curve of said amplifier between adjacent lower responses, a maximum response in the low frequency range followed by a relatively flat frequency response above the frequency of operation of said mechanical rectifier.

5. In combination, an A. C. amplifier having an input circuit for recurring input signals and an output circuit, a synchronous rectifier in said output circuit subject to small shifts in phase in operation thereof, means including a negative feedback circuit having in series between said output and input circuits parallel connected resistance and capacitance for producing a nonlinear frequency-output characteristic of said amplifier within a frequency band from about one-sixth to about twice that of said synchronous rectifier, thereby to prevent production by said rectifier of signals due solely to said shifts in phase of said rectifier.

6. In combination, an A. C. amplifier having an input circuit for application thereto of pulses at a predetermined repetition rate, an output circuit in which there appears an output signal including amplified pulses corresponding with those applied to said input circuit, said amplifier having a plurality of stages of amplification, at least one stage having an input circuit characterized by a short time constant, means for making substantially uniform the output signal level between said pulses comprising a negative feedback circuit between said output and input circuits including impedance elements, at least one of which exhibits materially different impedance for high and low frequency components of said pulses for producing greater degenerative effect for the high frequency components than the low frequency components, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

7. In combination, an A. C. amplifier having an input circuit for application thereto of pulses or groups of pulses at a predetermined repetition rate, an output circuit in which there appears an output signal including amplified pulses corresponding with those applied to said input circuit, said amplifier having a plurality of stages of amplification, at least one stage having an input circuit characterized by a short time constant, means for making substantially uniform the output signal level between said pulses comprising a negative feedback circuit between said output and input circuits including impedance elements one of which has a low impedance for high frequency components of said pulses and a high impedance for lower frequency components of said pulses, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

8. An A. C. amplifier for use in a spectrometer having a source of radiant energy operable at a predetermined repetition rate and a phototube responsive to a selected line of the spectrum of said radiant energy for producing pulses at said predetermined repetition rate, said amplifier having an input circuit and an output circuit in which there appears an output signal including amplified pulses corresponding with those applied to said input circuit, means for making substantially uniform the output signal level between said pulses comprising a negative feedback circuit between said output and input circuits including impedance elements one of which has a low impedance for high frequency components of said pulses and a high impedance for lower frequency components of said pulses, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

9. A system of measuring the relative intensities of two selected spectral lines produced at a predetermined repetition rate comprising phototubes respectively viewing said spectral lines, a D. C. ratio recorder for comparing the output of one phototube relative to the other, and an A. C. amplifier disposed between each phototube and said ratio recorder, and each having an input circuit for application thereto of groups of pulses at a predetermined repetition rate, an output circuit in which there appears an output signal including amplified pulses corresponding with those applied to said input circuit, means for making substantially uniform the output signal level between said pulses comprising a negative feedback circuit between said output and input circuits including impedance elements one of which has a low impedance for high frequency components of said pulses and a high impedance for lower frequency components of said pulses, a synchronous rectifier in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

10. A system of measuring the relative intensities of two selected spectral lines produced at a predetermined repetition rate comprising phototubes respectively viewing said spectral lines, a D. C. ratio recorder for comparing the output of one phototube relative to the other, and an A. C. amplifier disposed between each phototube and said ratio recorder, and each having an input circuit for application thereto of groups of pulses at a predetermined repetition rate, an output circuit in which there appears an output signal including amplified pulses corresponding with those applied to said input circuit, means for making substantially uniform the output signal level between said pulses comprising a negative feedback circuit between said output and input circuits including impedance elements, at least one of which exhibits materially different impedance to high and low frequency components of said pulses for producing greater degenerative effect for the high frequency components than the low frequency components, a synchronous rectifier of the mechanical type in said output circuit inherently subject to phase shift producing spurious output signals, and means for operating said synchronous rectifier to produce its switching operations during the time said output signal level is maintained substantially uniform in avoidance of production of spurious output signals due solely to small shifts in phase in operation of said rectifier.

11. A system of measuring the relative intensities of two selected spectral lines produced at a predetermined repetition rate comprising phototubes respectively viewing said spectral lines; a D. C. ratio recorder for comparing the output of one phototube relative to the other, an A. C. amplifier disposed between each phototube and said ratio recorder, each having an input circuit for application thereto of pulses at a predetermined repetition rate, an output circuit in which there appears an output signal including amplified pulses corresponding with those applied to said input circuit, means for making substantially uniform the output signal level between said pulses comprising a negative feedback circuit between said output and input circuits including impedance elements, at least one of which exhibits materially different impedance to high and low frequency components of said pulses for producing greater degenerative effect for the high frequency components than the low frequency components; a synchronous rectifier in said output circuit inherently subject to phase shift producing spuriuous output signals, and means including a reference voltage for operating said synchronous rectifier to produce its switching operations during the time said output signal level is maintained substantially uniform in avoidance of production of spurious output signals due solely to small shifts in phase in operation of said rectifier.

12. In combination, an A. C. amplifier having an input circuit for application thereto of pulses at a predetermined repetition rate, an output circuit in which there appears an output signal including amplified pulses corresponding with those applied to said input circuit, said amplifier having the characteristic that the output signal level between said pulses is substantially uniform, a synchronous rectifier in said output circuit having linear response but inherently subject to phase shift producing spurious output signals, and means for operating said synchronous rectifier to produce its switching operations during the time said output signal is substantially uniform in avoidance of production of spurious output signals due to said inherent phase shift of the rectifier.

ALBERT J. WILLIAMS, Jr.

References Cited in the file of this patent

UNITED STATES PATENTS

| Number | Name | Date |
|---|---|---|
| 2,241,533 | Bliss | May 13, 1941 |
| 2,370,692 | Shepherd | Mar. 6, 1945 |
| 2,388,105 | Wilson | Oct. 30, 1945 |
| 2,502,319 | Golay | Mar. 28, 1950 |
| 2,522,976 | Williams | Sept. 19, 1950 |